Oct. 29, 1946.     A. C. LUSHER     2,410,090
SELF-LOCKING NUT
Filed June 29, 1944

INVENTOR
ALBERT C. LUSHER DECEASED BY
THE CITIZENS AND MANUFACTURERS
NATIONAL BANK OF WATERBURY,
ADMINISTRATOR
BY
Kenyon + Kenyon
ATTORNEYS Patented Oct. 29, 1946

2,410,090

UNITED STATES PATENT OFFICE 2,410,090

SELF-LOCKING NUT

Albert C. Lusher, deceased, late of Waterbury, Conn., by the Citizens and Manufacturers National Bank of Waterbury, administrator, Waterbury, Conn.

Application June 29, 1944, Serial No. 542,685

8 Claims. (Cl. 151—21)

This invention relates to self-locking nuts.

An object of this invention is an all-metal self-locking nut of simple structure, of low manufacturing cost and of highly efficient locking effect.

One embodiment of this nut comprises a cup-shaped metal shell of polygonal cross-section having a central bottom aperture. In the shell is arranged an apertured threaded nut member of the same external configuration as the interior configuration of the shell to prevent rotation of the nut member relative to the shell. A sheet metal inset of polygonal configuration is arranged in the shell and is held against rotation by engagement with the interior polygonal surface of the shell. The shell has bendable means for locking the inset and nut member in the shell. The inset has a central tubular shaped portion in axial alinement with the nut member aperture and the nut member and tubular member are provided with identical but slightly out-of-phase interior threads. Upon threading of a bolt through the nut member and into the threaded tubular portion of the inset, frictional engagement is established between the co-operating threads of such a nature as to lock the nut securely to the bolt.

Other objects, novel features and advantages of this invention will become apparent from the following specification and accompanying drawing, wherein.

Figure 1:
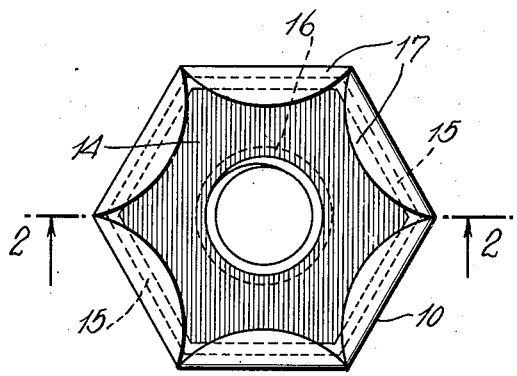
Fig. 1 is a plan view of a self-locking nut embodying the invention.
Figure 2:
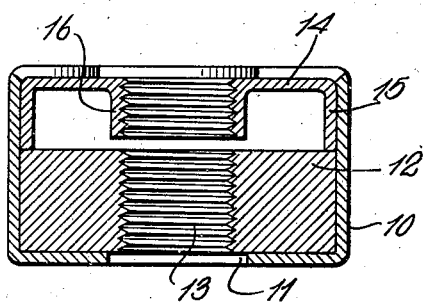
Fig. 2 is a section on the line 2—2 of Fig. 1.

A cup-shaped metal shell 10 of polygonal cross-section is provided with a central bottom aperture 11. In the shell 10 is arranged a standard type nut 12 of polygonal configuration having its exterior walls engaging the inner walls of the shell 10 to prevent rotation of the nut member relative to the shell. A central threaded aperture 13 extends through the nut member in alinement with the shell bottom aperture 11.

In the shell 10 above the nut member 12 is arranged a sheet metal inset 14 having a flange 15, the exterior configuration of which conforms to the interior configuration of the shell 10 to prevent rotation of the inset relative to the shell. The rim of the flange 15 engages the surface of the nut member 12. The inset 14 is provided with a central tubular portion 16 extending toward the nut member 12 in axial alinement with the nut member bore 13. The shell 10 is provided with tapering tabs or projections 17 which are bendable over the inset 14 to retain the inset and nut member 12 in the shell.

The nut member bore and the tubular member bore are identically threaded but the arrangement is such that the thread of the tubular member 16 is slightly out of phase with the thread of the nut member 12. Thus, the threading of a bolt through the nut member 12 and the tubular portion 16 produces sufficient friction on the bolt threads securely to lock the nut thereto.

Figure 3:
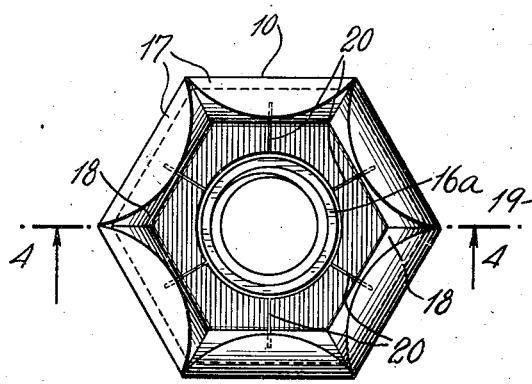
Fig. 3 is a plan view of a modified form of self-locking nut embodying the invention.
Figure 4:
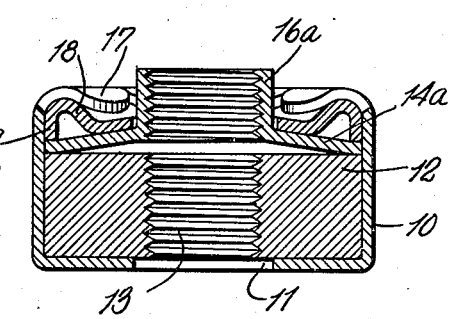
Fig. 4 is a section on the line 4—4 of Fig. 3.

In the modification illustrated in Figs. 3 and 4, the shell 10 and the nut member 12 are identical with the corresponding members of the first embodiment and the shell 10 is provided with a central bottom aperture 11. Also, the nut member is provided with a threaded bore 13. A sheet metal inset 14a has a polygonal periphery corresponding to the interior configuration of the shell 10 and rests on the exposed face of the nut member 12. The inset 14a is slightly conical so that there is clearance between the inset and nut member except at the edges thereof. A tubular interiorly threaded portion 16a projects from the inset 14a. A spring washer 18 rests on the inset 14a and has a central aperture through which the tubular portion 16a extends. The washer 18 has a beaded portion 19 conforming to the interior of the shell 10 and tabs 17 projecting from the upper edge of the shell 10 are bent over the bead portion 19 to lock the washer inset and nut member in the shell. Preferably, the central portion of the washer is radially slit at several places 20.

The threads in the nut member 12 and in the tubular portion 16a are identical but are slightly out of phase. Thus, the threading of the bolt through the nut member bore and through the tubular portion produces sufficient friction on the bolt to lock the nut securely thereto. The provision of the radial slits 20 allows the washer 18 to yield somewhat when the nut is assembled on the bolt. When the bolt binds with the out-of-phase thread of the tubular portion 16a, the washer will yield slightly to facilitate the introduction of the bolt.

In each modification, the out-of-phase relation between the threads of the nut member and the tubular portion of the inset is such that the screwing in of a bolt passing through the nut member into the tubular portion tends to move the tubular portion away from the nut member. The out-of-phase relation is obtained by simultaneously tapping the nut member and tubular portion after completion of the assembly thereof with the shell 10 and then moving the tubular portion toward the nut member by a distance less than one-half the thread pitch. In the first modification, such movement is permitted by the clearance between the inner end of the tubular portion 16 and the nut member 12 while in the second modification such movement is permitted by reason of the conical shape of the inset.

What is claimed is:

1. A device of the character described comprising a permanently assembled entity consisting of a metal cup-shaped shell of polygonal cross-section having a central aperture in its bottom, an apertured threaded nut member in said shell and having plane end surfaces one of which engages the cup bottom, and a sheet metal inset of polygonal configuration having a right-angle flange the rim of which engages the remaining end surface of said nut member with the remainder of said inset spaced from said remaining end surface, said inset having a central tubular threaded portion with its threads out of phase with the threads of said nut member and said shell having bendable means for engagement with said inset to lock the inset and nut member in said cup.

2. A device according to claim 1 characterized by said tubular portion extending from said inset toward said nut member.

3. A device of the character described comprising a metal cup-shaped shell of polygonal cross-section, an apertured threaded nut member in said shell engaging the cup bottom, a central aperture in the cup bottom in alinement with said nut aperture, a metal inset of polygonal configuration arranged in said shell and having a central threaded portion with the threads thereof out of phase with the threads of said nut member, a metal washer having an aperture receiving said tubular portion and having a beaded periphery conforming in configuration to the interior of the metal shell, said shell having bendable means engageable with the bead to retain said washer and said nut member in said shell.

4. A device according to claim 3 in which said washer is provided with a plurality of radially arranged slits.

5. A device according to claim 3 in which said washer is provided with individual resilient fingers engaging the base of the inset.

6. A self-locking nut unit comprising a sheet metal cupped shell of polygonal shape having an apertured base end and an open end, a standard tapped nut blank seated in the base of said cupped shell and of a size and shape complemental to the interior of said cupped shell, and a sheet metal insert having a central barrel portion with an interior thread alined with the nut blank thread and a flanged portion of a resilient character having a peripheral edge of a shape complemental to the interior of said cupped shell and resting on the adjacent face of said nut blank, the threaded barrel portion being removed from said nut blank and having its thread out-of-phase relative to the thread of said nut blank, the upper open end of said cupped shell being inturned to hold the parts together as a unitary structure.

7. A self-locking nut unit comprising a sheet metal cupped shell of polygonal shape having an apertured base end and an open end terminating in a series of lugs, a standard tapped nut blank seated in the base of said cupped shell and of a size and shape complemental to the interior of said cupped shell, and a sheet metal insert having a central barrel portion with an interior thread alined with the nut blank thread and a flanged portion of a resilient character having a peripheral edge of a shape complemental to the interior of said cupped shell and resting on the adjacent face of said nut blank, the threaded barrel portion being removed from said nut blank and having its thread out-of-phase relative to the threads of said nut blank, the lugs of said cupped shell being turned over against said insert flange for locking the same in said nut unit.

8. A self-locking nut unit comprising a sheet metal cupped shell of polygonal shape having an apertured base end and an open end, a standard tapped nut blank seated in the base of said cupped shell and of a size and shape complemental to the interior of said cupped shell, and a sheet metal insert having a resilient flange comprising the outer face of the nut unit, said flange having a depending edge wall of a shape complemental to the interior of the cupped shell with its edge resting upon said nut blank and the center portion of said insert flange formed into a barrel directed toward said nut blank and having a tapped interior alined with the thread of said nut blank and out-of-phase relative thereto, the upper end of said cupped shell being bent over in intimate contact with said flange to hold the nut blank, cupped shell and insert together as a unit.

THE CITIZENS AND MANUFACTURERS
NATIONAL BANK OF WATERBURY,
By THOMAS F. MOORE,
*Trust Officer,*
*Administrator of the Estate of Albert C. Lusher, Deceased.*